United States Patent [19]
Jakobs et al.

[11] 4,278,369
[45] Jul. 14, 1981

[54] DEVICE FOR ROUGH TURNING AND SHAFT TURNING

[75] Inventors: Ewald Jakobs; Gernot Lang, both of Schwalbach, Fed. Rep. of Germany

[73] Assignee: Röchling-Burbach Weiterverarbeitung GmbH, Völklingen-Saar, Fed. Rep. of Germany

[21] Appl. No.: 47,112

[22] Filed: Jun. 11, 1979

[30] Foreign Application Priority Data

Jun. 12, 1978 [DE] Fed. Rep. of Germany ....... 2825748

[51] Int. Cl.³ .............................................. B26D 1/00
[52] U.S. Cl. ..................................... 407/113; 407/114
[58] Field of Search ........................ 407/113, 114, 115

[56] References Cited

U.S. PATENT DOCUMENTS

| | | | |
|---|---|---|---|
| 4,086,016 | 4/1978 | Goeke | 407/114 |
| 4,111,589 | 9/1978 | Goeke | 407/114 |

FOREIGN PATENT DOCUMENTS

| | | | |
|---|---|---|---|
| 1800195 | 10/1970 | Fed. Rep. of Germany | 407/114 |
| 2238888 | 8/1975 | Fed. Rep. of Germany | 407/114 |
| 2734095 | 2/1978 | Fed. Rep. of Germany | 407/114 |
| 2820810 | 11/1979 | Fed. Rep. of Germany | 407/113 |

*Primary Examiner*—Leonidas Vlachos

[57] ABSTRACT

In a device for rough turning and shaft turning of a workpiece, a cutting insert is provided with a main cutting edge followed by an auxiliary cutting edge. The main cutting edge is divided into a first main cutting edge functioning as a rough cutter followed by a second main cutting edge performing rough smoothing and then by the auxiliary cutting edge which provides the final smoothing. The first main cutting edge is set at a greater angle to the axis of the workpiece than the second main cutting edge which, in turn, is set at a greater angle to the axis of the workpiece than the auxiliary cutting edge.

5 Claims, 8 Drawing Figures

DEVICE FOR ROUGH TURNING AND SHAFT TURNING

SUMMARY OF THE INVENTION

The invention is directed to a device for rough turning and shaft turning a workpiece with the cutting being effected by an insert having a main cutting edge followed by an auxiliary cutting edge.

The rough turning of bars, pipes or wire is used widely. Accordingly, the operators of rough turning or peeling machines and the manufacturers of tools for such machines continuously attempt to improve the working operations to produce products inexpensively yet of high quality. Particular attention is paid to the design of the geometry of the cutting edges of the cutting element and, in most cases, the cutting member is an insert formed of high-speed steel or carbide metal or the combination of these two materials. Depending on its intended use, the cutting insert has one or more cutting edges.

A chip-removing tool for rough turning and shaft turning is known in which the cutting insert is constructed as an oblong octagon, see German Pat. No. 1,800,195. Very good results have been achieved with such a cutting insert with respect to the surface quality of the peeled material.

For faster feeding of the workpiece, this known cutting insert has been further developed by extending it in the region of the cutting corner by a straight stretch which is oriented parallel relative to the longitudinal axis of the workpiece and acts as an auxiliary cutting edge, note German Auslegeschrift No. 22 38 888.

For obtaining greater cutting depths, a tool is known in which two cutting plates are arranged one behind the other, see German Offenlegungsschrift No. 27 34 095. This tool, using two different cutting plates, is relatively cumbersome.

Therefore, it is the primary object of the present invention to provide a cutting edge for a peeling or rough turning tool which can be operated at low cost while effecting great cutting depths and fast feeds.

In accordance with the present invention, a cutting insert is provided having a first main cutting edge, immediately followed by a second main cutting edge which, in turn, is followed by an auxiliary cutting edge. The angle of the first main cutting edge relative to the longitudinal axis of the workpiece is greater than the angle of the second main cutting edge relative to the axis of the workpiece. Similarly, the angle of the second main cutting edge is greater than the angle of the auxiliary cutting edge relative to the longitudinal axis of the workpiece.

In a preferred embodiment of the invention, the angle between the first main cutting edge and the longitudinal axis of the workpiece is 20° to 30°. The setting angle between the second main cutting edge and the axis of the workpiece is set at an angle of between 5° and 20°.

Furthermore, the angle between the auxiliary cutting edge and the axis of the workpiece is between 0° and 1°.

The length of the first main cutting edge should be smaller than the length of the second main cutting edge. Preferably, the ratio of the lengths of the two cutting edges should be in the range of 1:2 to 1:4.

By utilizing the device embodying the present invention, it is possible to achieve the advantages of a very high cutting efficiency while the space required is kept small and both the initial cost and the operating cost are maintained at a low level. Additionally, the peeled workpiece has a very good surface.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
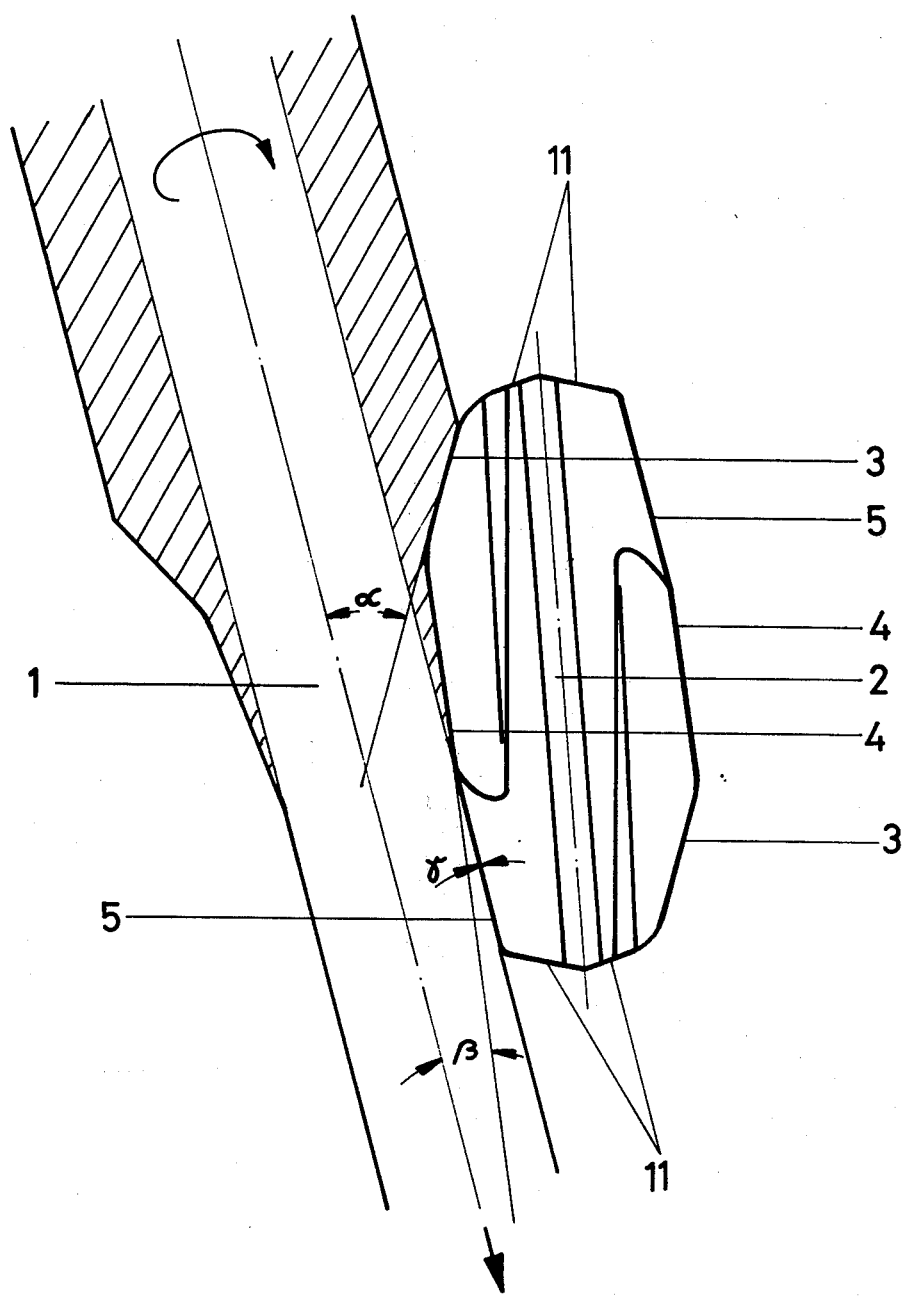
FIG. 1 is a schematic view of the device embodying the present invention shown in position relative to a workpiece.
Figure 2:
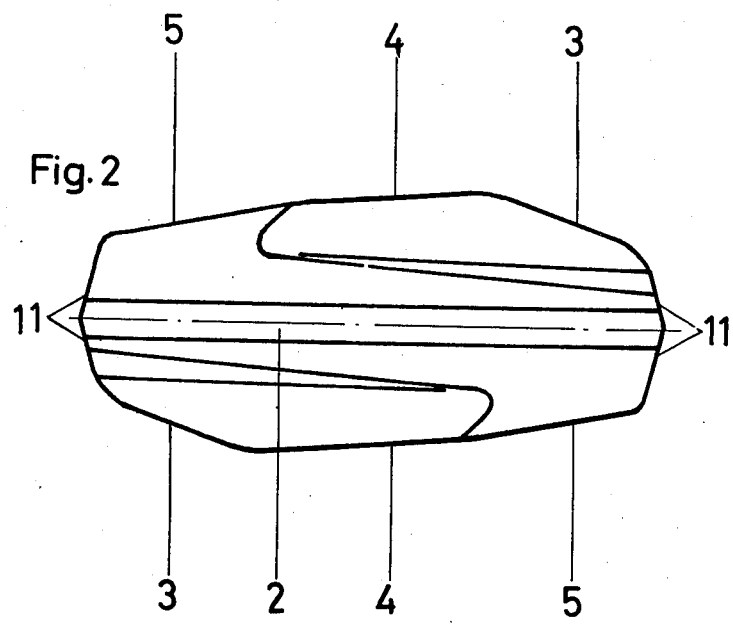
FIGS. 2, 3 and 4 are three different views of a rotatable and reversible cutting insert constructed in accordance with the present invention.
Figure 3:
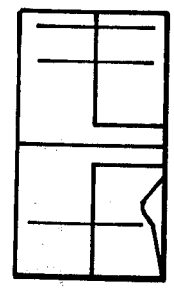
Figure 4:
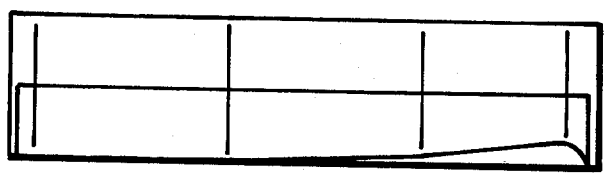

In FIG. 1, a workpiece 1 is shown in position to be peeled or cut by a cutting insert 2. For the sake of clarity, the mount for the cutting insert 2 which contacts the support surfaces 11, is not shown. The essential difference of cutting insert 2, shown in three different views in FIGS. 2, 3 and 4, compared to the prior art devices, resides in the two main cutting edges 3,4 one following the other and with an auxiliary cutting edge extending from the downstream end of the main cutting edges. First main cutting edge 3 acts as a rough cutter or precutter, while the second main cutting edge 4 effects the remaining chip removal and provides a rough smoothing for surfaces which are true to size. Accordingly, the chip removed from the workpiece is divided into two chips, the first main cutting edge 3 removes one chip and the second main cutting edge 4 removes the other. Final smoothing of the workpiece is formed by the auxiliary cutting edge 5. In addition, the auxiliary cutting edge 5 also acts as a guide for the workpiece 1.

The setting angles $\alpha$ and $\beta$ between the main cutting edge 3 and the second main cutting edge 4 relative to the longitudinal axis of the workpiece are of particular importance. In one application, in the rough turning or peeling of steel rods, the following setting angles $\alpha = 30°$ and $\beta = 7°$ were selected. The angle $\gamma$ between the auxiliary cutting edge 5 and the axis of the workpiece was chosen as 0°. The weight of the chips obtained per unit of time serves as proof of the very high cutting efficiency which was achieved, that is, about 7 tons per hour. In the past heavy-duty cutting machines were used, a maximum amount of chips of about 3.5 tons per hour were obtained. This difference illustrates the advantage of the cutting insert of the present invention with the two main cutting edges 3,4 arranged one behind the other in the axial direction of the workpiece and with the axial cutting edge 5 extending from the downstream end of the second main cutting edge 4.

The setting angles α, β and γ are not limited to the above values. Based on the workpiece to be cut, the desired cutting efficiency, the surface properties of the material to be peeled and the size of the cutting insert, these angles may vary within the following ranges: α=20° to 30°, β=5° to 20°, γ=0° to 1°.

Advantageously, the length of the first main cutting edge 3 is made smaller than the length of the second main cutting edge. The ratio of the lengths of the first main cutting edge 3 to the second main cutting edge 4 is in the range of 1:2 to 1:4. As a rule, the length of the auxiliary cutting edge corresponds approximately to the length of the second main cutting edge, however, the length of the auxiliary cutting edge 5 should be at least equal to, if not greater than, the length of the second main cutting edge 4.

Figures 5, 6:
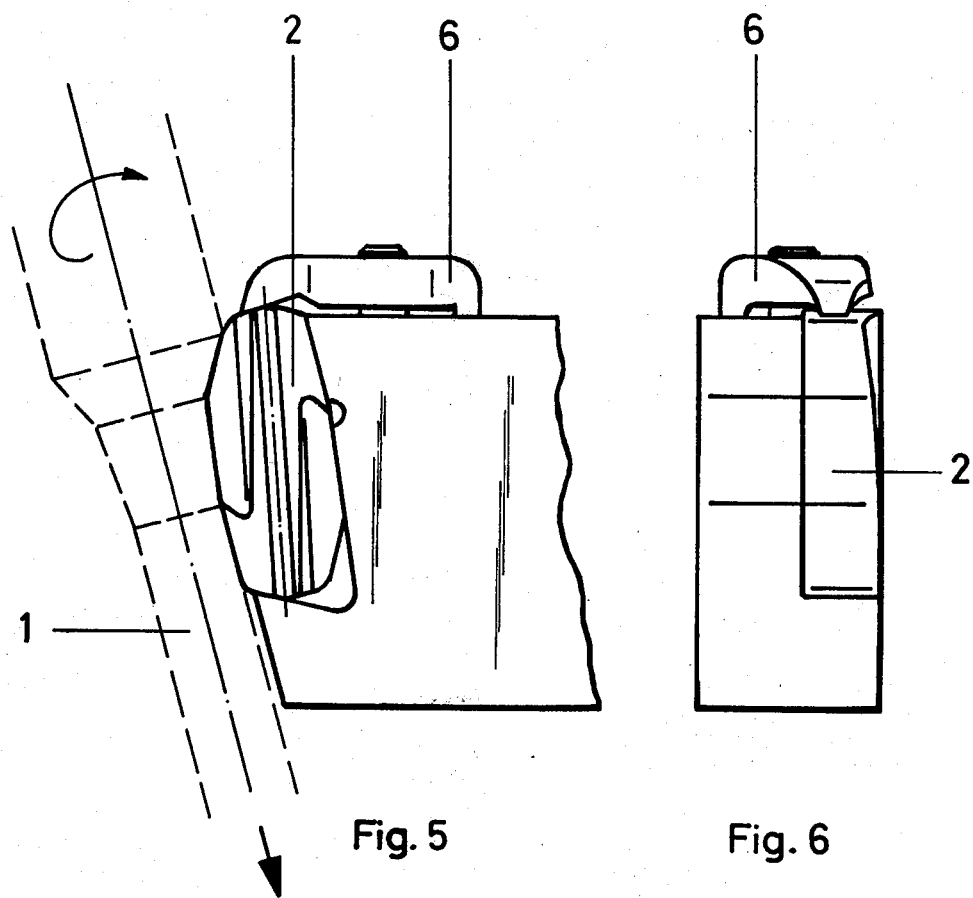
FIGS. 5 and 6 are two views of a mounting arrangement for the cutting insert.

The cutting insert 2 can be mounted in a conventional manner by means of a claw 6, note FIGS. 5 and 6. Other mounting arrangements can also be used without departing from the scope of the invention. For example, the cutting insert 2 may contain a bore 7 into which a clamping device fits which is known per se. Such an arrangement is illustrated schematically in FIG. 7.

Figure 7:
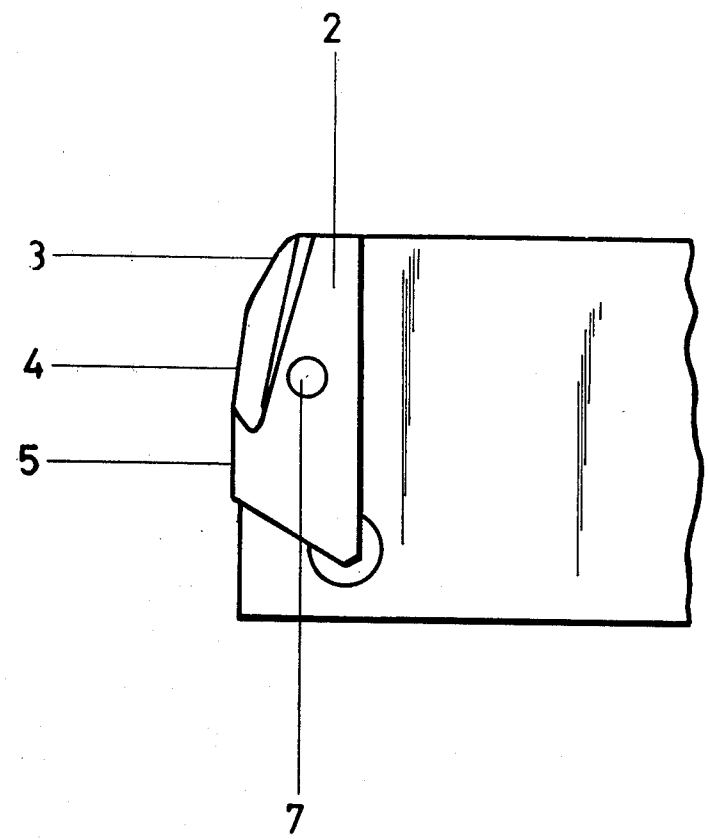
FIG. 7 illustrates another mounting arrangement for the cutting insert.

Cutting insert 2 can be shaped so that it can be rotated and reversed, that is, it is provided with four cutting edges and can be turned into four positions. In some instances it may be advantageous to provide the cutting insert with only two cutting edges, such as shown in FIGS. 2, 3 or 4 or even with a single cutting edge as illustrated in FIG. 7.

Figure 8:
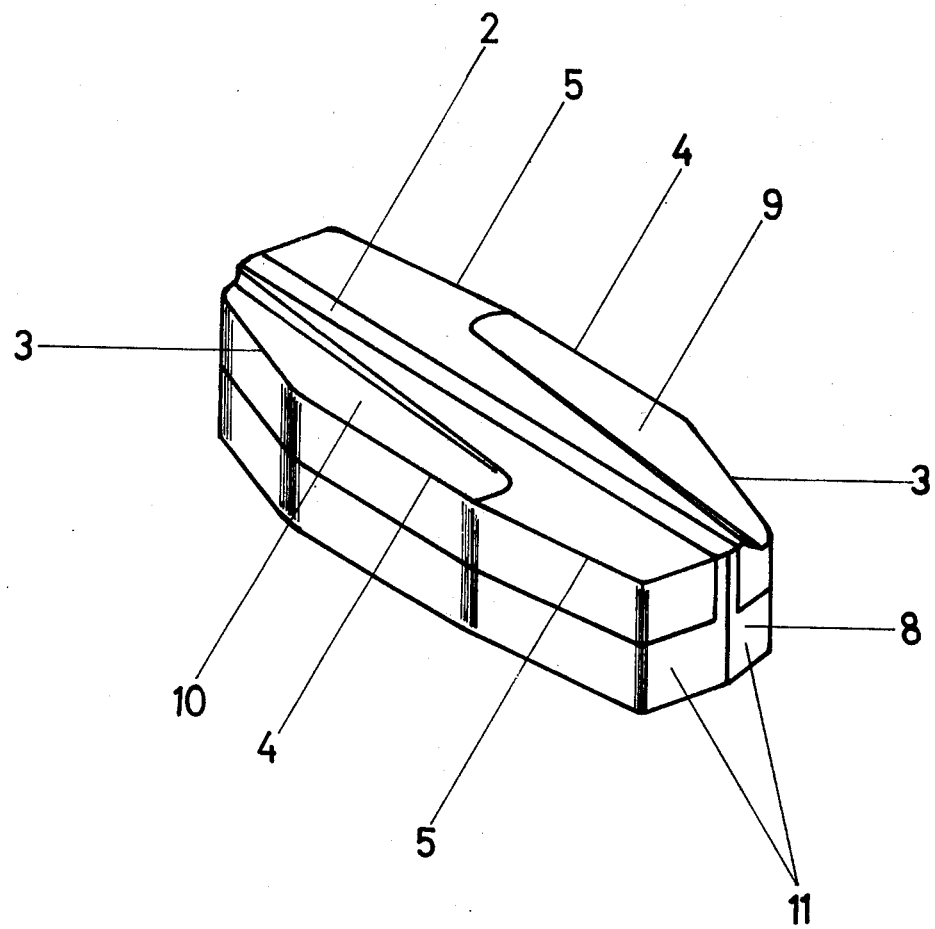
FIG. 8 is a perspective view illustrating a special embodiment of the cutting insert incorporating the present invention.

Depending on its intended use and size, the cutting insert 2 may be made entirely of carbide metal or of a high-speed steel. For many purposes, it is advisable to form the base for mounting the body 8 of the cutting insert 2 of high-speed steel and to solder strip-like parts 9 and 10 on which the cutting edges 3,4 and 5 provided. Such a cutting insert is shown in FIG. 8.

The device of the present invention is not limited to carbide metal and high-speed steel, other materials can be used. An example of another kind of material is a cutting ceramic.

While specific embodiments of the invention have been shown and described in detail to illustrate the application of the inventive principles, it will be understood that the invention may be embodied otherwise without departing from such principles.

I claim:

1. Device for rough turning and shaft turning an axially extending workpiece including a cutting insert having a cutting edge comprising a main cutting edge and an auxiliary cutting edge said main cutting edge having a first end leading in the cutting direction as said device moves relative to the workpiece and a second end spaced from the first end, wherein the improvement comprises that said cutting edge being asymmetrical, said main cutting edge comprises a first main cutting edge extending from the first end thereof toward the second end with said first main cutting edge spaced from the second end, and a second main cutting edge extending from the end of said first main cutting edge spaced from the first end to the second end of said main cutting edge and said auxiliary cutting edge extending from said second main cutting edge at the second end of said main cutting edge, said first main cutting edge and said second main cutting edge intersecting and forming a first obtuse interior angle and said second main cutting edge and said auxiliary cutting edge intersecting and forming a second obtuse interior angle with said second obtuse interior angle being greater than said first obtuse interior angle, said cutting insert being positionable relative to the workpiece for effecting turning so that said first main cutting edge is set at an angle α relative to the axis of the workpiece, said second main cutting edge is set at an angle β relative to the axis of the workpiece and said auxiliary cutting edge is set at an angle γ relative to the axis of the workpiece, and the angle α of said first main cutting edge being greater than the angle β of said second main cutting edge and the angle β of said second main cutting edge being greater than the angle γ of said auxiliary cutting edge, and the length of said first main cutting edge between the first and second ends of said main cutting edge being less than the length of said second main cutting edge between the first and second ends of said main cutting edge and said auxiliary cutting edge having a length at least as long as the length of said second main cutting edge.

2. Device, as set forth in claim 1, wherein with said device positioned relative to the workpiece for effecting turning, the angle α between said first main cutting edge and the axis of the workpiece is in the range of 20° to 30°.

3. Device, as set forth in claim 2, wherein the angle β between said second main cutting edge and the axis of the workpiece is in the range of 5° to 10°.

4. Device, according to claim 3, wherein the angle γ between said auxiliary cutting edge and the axis of said workpiece is in the range of 0° to 1°.

5. Device, as set forth in claim 1, wherein the ratio of the lengths of said first main cutting edge to said second main cutting edge is in the range of 1:2 to 1:4.

* * * * *